Patented Oct. 1, 1935

2,016,072

UNITED STATES PATENT OFFICE 2,016,072

PRODUCTION OF ALKYL HALIDES

William Stansfield Calcott, Pennsgrove, N. J., and Herbert Wilkens Daudt, Wilmington, Del., assignors to E. I. du Pont de Nemours & Company, Wilmington, Del., a corporation of Delaware No Drawing. Application January 3, 1933, Serial No. 650,040

8 Claims. (Cl. 260—162)

This invention relates to alkyl halides, more particularly alkyl halides of the lower aliphatic series, and a process for the manufacture thereof.

It is known that ethyl chloride may be produced by various procedures involving the use of ethyl alcohol as a starting material, for example, by a batch process in which dilute sulfuric acid, sodium chloride and ethyl alcohol are heated together. According to such a process, the ethyl alcohol and sulfuric acid are slowly introduced into a mixture of sodium chloride and dilute sulfuric acid, and the ethyl chloride evolved is passed through a reflux condenser which prevents the alcohol from escaping unchanged from the reaction vessel. This type of process has the disadvantage that a considerable time, generally about forty to fifty hours, is required to finish one batch.

According to another process for the production of ethyl chloride, ethyl alcohol and concentrated sulfuric acid are introduced slowly into a mixture of dilute sulfuric acid and sodium chloride, and the evolved vapors comprising substantially ethyl chloride, ethyl alcohol, hydrogen chloride and water are all allowed to escape and are carried into a second reaction vessel without being refluxed on leaving the first vessel. The second vessel contains a catalyst which promotes further reaction between the hydrogen chloride and the ethyl alcohol. As a result, the products obtained are largely ethyl chloride and water. This process has the advantage that a considerable saving of time is effected over that required in the previously described process.

In both of the procedures above described, however, ethyl alcohol is one of the starting materials and, since this does not occur as a natural raw material, it is obtained by a separate process of manufacture. It will be apparent, therefore, that in the manufacture of an alkyl halide by the foregoing procedures there are at least three separate manufacturing operations involved, viz., the production of sulfuric acid, the manufacture of the alcohol, and the combination of these two materials together with a metallic halide to form the alkyl halide.

It is an object of the present invention to provide a new and improved process for the production of alkyl halides. A further object is the provision of a process whereby alkyl halides may be produced more directly, that is, by a procedure involving a fewer number of manufacturing operations, than in prior art processes of the character previously described. Another object is the provision of a process for the manufacture of alkyl halides by a reaction which proceeds smoothly and involves as one of the reactants an olefine hydrocarbon. A still further object is the provision of a continuous process for the production of alkyl halides. A more specific object is the provision of a new and improved process for the production of ethyl chloride. Other objects will appear hereinafter.

These objects are accomplished according to the present invention whereby alkyl halides containing two to four carbon atoms, inclusive, are produced by a process which involves bringing together an olefine hydrocarbon containing two to four carbon atoms, inclusive, sulfuric acid and a hydrogen halide, which is preferably formed in situ in the reaction zone by the reaction of sulfuric acid and a metallic halide, and effecting the reaction in liquid phase above the boiling point of the formed alkyl halide under the conditions of reaction. The evolved vapors are preferably removed from the reaction zone continuously and treated to recover the alkyl halide. According to certain preferred embodiments of the invention, the reaction is controlled to produce a mixture of vapors comprising substantially the alkyl halide, the alkyl alcohol, water and a hydrogen halide. This mixture of vapors is then preferably passed through a catalyst capable of promoting reaction between the alkyl alcohol and hydrogen halide whereby the alkyl halide and water are obtained, the alkyl halide being recovered in any suitable manner.

While the invention is susceptible to considerable variation and modification in the manner of its practical application, particularly as regards the nature and proportions of the reactions and catalyst, the physical factors of temperature and pressure, and the exact manner of procedure, the following examples, in which the parts are by weight, will serve to illustrate how the invention may be practiced.

Example I

About 635 parts of 93% sulfuric acid were introduced into a closed steel tower through which the acid could be circulated from an accessory steel vessel. After starting circulation of the acid, the temperature was raised to about 90° C. and maintained during the addition to the acid stream in the tower of about 140 parts of ethylene under a pressure of about 150 pounds per square inch. When absorption of the ethylene was practically complete, the resultant product, comprising substantially ethyl sulfuric acid, sulfuric acid and some diethyl sulfate, was gradually and continuously introduced into a mixture of 100 parts of water and 400 parts of sodium chloride contained in a vessel lined with an acid-proof ceramic material and provided with a lead heating coil. Prior to the introduction of the ethylene-sulfuric acid reaction product, the sodium chloride-water mixture was heated to a temperature of about 103° C. to 107° C. During the introduction of the ethylene-sulfuric acid reaction product over a period of six hours, the reaction zone was maintained at a temperature of about 100° C. to 108° C. About 200 parts of water were also added to the reaction zone gradually and continuously during this period. Subsequently, the temperature was raised to about 130° C. during a period of about four hours. The reaction zone was maintained under substantially atmospheric pressure and provided with an outlet for the evolved vapors. The temperature was always above 100° C. but not above the boiling point of the reaction mixture, so that the reaction was effected in liquid phase.

A mixture of vapors comprising substantially ethyl chloride, ethyl alcohol, hydrochloric acid and water vapor passed from the reaction zone and were introduced into 1500 parts of a 70% solution of zinc chloride in water, maintained at a temperature of about 135° C. The volume of this solution was maintained approximately constant by the continuous addition of water.

The vapors from the zinc chloride solution, which consisted largely of ethyl chloride and water, together with some hydrochloric acid, ethyl alcohol and diethyl ether were passed successively through scrubbers containing water, dilute sodium hydroxide and 93% sulfuric acid. The vapors of the acid-free and dry ethyl chloride were then passed to a suitable condenser maintained at a temperature of about −10° C., and 225 parts of ethyl chloride were collected in a receiver. Based upon the amount of ethylene used, the yield of ethyl chloride was about 69%.

Example II

Into 525 parts of 93% sulfuric acid circulated in a closed steel vessel equipped with vigorous agitating means, 140 parts of ethylene were absorbed while maintaining a pressure of about 300 pounds per square inch and a temperature of about 90° C. Subsequently, the pressure was released and the resultant product continuously introduced into a reaction zone wherein were contained 220 parts of 50% sulfuric acid and 405 parts of sodium chloride. The temperature of the reaction zone was maintained at about 103° C. to 107° C. during the addition of the ethylene-sulfuric acid reaction product at a uniform rate over a period of about five hours. At the same time, 210 parts of water were added at a uniform rate. Subsequently, the temperature was raised to about 125° C. during a period of from two to two and one-half hours.

During the addition of the ethylene-sulfuric acid mixture and thereafter during the further heating at the higher temperature, a mixture of vapors, comprising substantially ethyl chloride, ethyl alcohol, hydrochloric acid and water vapor, passed from the reaction vessel. According to the method described in Example I, these vapors were passed successively through a heated 70% zinc chloride solution, a water-cooled condenser, a water scrubber, a dilute caustic soda scrubber and a concentrated sulfuric acid scrubber. The resultant vapors were then condensed, whereby about 275 parts of liquid ethyl chloride were obtained, which represents a yield of about 85%, based on the amount of ethylene used.

Example III

In 525 parts of 93% sulfuric acid circulated in a closed steel vessel equipped with vigorous agitating means, 140 parts of ethylene were absorbed, while maintaining a pressure of about 300 pounds per square inch and a temperature of about 90° C. Subsequently, the pressure was reduced to atmospheric and the resultant product was introduced into a vessel lined with an acid-proof ceramic material. During a period of three hours, 585 parts of 37% aqueous hydrochloric acid were added at a uniform rate, the temperature being gradually raised from about 90° C. to about 115° C. After the addition of the hydrochloric acid, the temperature was raised to 130° C. during the course of two hours.

The vapors evolved during the reaction were passed through a 70% solution of zinc chloride maintained at a temperature of about 135° C to about 140° C. Ethyl chloride was recovered as described in Example I.

Example IV

The procedure of Example III was followed except that instead of 585 parts of 37% aqueous hydrochloric acid, 1120 parts of 20% aqueous hydrochloric acid were introduced into the reaction zone, whereby a higher yield of ethyl chloride was obtained than in Example III.

Example V

Ethylene was absorbed in sulfuric acid (96%) under a pressure of about 300 pounds per square inch (gauge) by a continuous process. The process was so adjusted that the rate of introduction of the ethylene and sulfuric acid into the absorption zone and the rate of withdrawal of the ethylene-sulfuric acid mixture was such that the molar ratio of ethylene to sulfuric acid in the product withdrawn from the system was about 1:1.

This ethylene-sulfuric acid absorption mixture and 20% aqueous hydrochloric acid, in uniform proportions corresponding to about 65 parts of the absorption mixture per hour and 80 parts of the hydrochloric acid per hour, were continuously introduced into a reaction zone maintained at a temperature of about 115° C. to about 125° C. wherein was contained the residue obtained after reacting together hydrochloric acid and an ethylene-sulfuric acid mixture as described in Example IV.

Three hours after the initial introduction of the ethylene-sulfuric acid absorption mixture into the reaction zone, continuous withdrawal of a portion of the reaction mass was started and thereafter continued at such a rate as to maintain the reaction mixture at approximately constant volume. The sulfuric acid in the reaction mixture thus withdrawn, if desired, may be recovered, concentrated and used again in the process for ethylene absorption; or the withdrawn reaction mixture may be treated in any other suitable manner for use again in the process.

The vapors containing the ethyl chloride evolved during the reaction were continuously removed from the reaction zone and passed through a 70% solution of zinc chloride maintained at a temperature of about 135° C. to about 140° C., and the ethyl chloride was recovered as described in Example I.

Instead of passing the vapors from the reaction zone through the zinc chloride solution, the ethyl chloride may be recovered directly by subjecting the vapors to purification and condensation.

Instead of introducing the hydrogen chloride into the reaction zone as an aqueous solution of hydrochloric acid, it may be formed in situ by the continuous introduction of sodium chloride and sulfuric acid, or by the introduction of sodium chloride and water.

While the examples illustrate particularly procedures involving the production of alkyl halides from ethylene, the process of the invention is generally applicable to the production from olefine hydrocarbons of alkyl halides which do not completely decompose at the temperature maintained in the reaction zone. As specific examples of the application of the invention may be mentioned, in addition to the production of ethyl halides from ethylene, the production of isopropyl halides such as, for example, isopropyl bromide and isopropyl chloride from propylene, and the production of butyl halides as, for example, butyl chloride and butyl bromide from butylene. The process is also useful in that a mixture of olefines or of gases containing olefines, such as those obtained in the cracking of petroleum oils may be converted into alkyl halides.

The proportions of the olefine hydrocarbon may be varied within relatively wide limits, depending largely upon the method of procedure and the results desired. In general, good results have been obtained in the use of about 0.8 to about 1.3 moles of olefine hydrocarbon per mole of sulfuric acid. It will be recognized, however, that larger or smaller proportions of olefine hydrocarbon may be employed.

The hydrogen halide may be introduced into the reaction zone in any suitable manner, for example, in the form of a gas or as an aqueous solution of hydrochloric acid, or it may be formed in situ by the reaction of an inorganic halide with the sulfuric acid or an alkyl sulfuric acid. From the standpoint of convenience, this latter method is generally preferred. The introduction of the hydrogen halide by the reaction of a metal halide with the ethylene-sulfuric acid reaction product also has the advantage in a process such as described in Example I that the mixture of metal halide and water, to which the ethylene-sulfuric acid reaction product is gradually added, may be maintained at a temperature above 100° C. prior to the addition of ethylene-sulfuric acid reaction product and during such addition without the use of super-atmospheric pressure to prevent boiling. As examples of metal halides which may be introduced into the reaction mixture to form the hydrogen halide in situ may be mentioned sodium chloride, potassium chloride, sodium bromide, potassium bromide, ammonium chloride, calcium chloride, magnesium chloride and magnesium bromide. In general, the halides of the alkali metal and alkaline earth metal groups are preferably employed. For the production of alkyl chlorides, sodium chloride is the most preferred salt because of its abundance, cheapness and fitness for the preferred procedures.

The proportions of metal halide are subject to considerable variation but should preferably correspond to at least one mol. per mol. of sulfuric acid to be reacted therewith in forming the hydrogen halide. Good results have been obtained in the use of an excess of metal halide, preferably about 25%.

The concentration of the sulfuric acid may vary within relatively wide limits depending particularly upon the olefine hydrocarbon reacted therewith and the results desired. Thus, in the absorption of ethylene, the concentration of the sulfuric acid should preferably be above about 90% and within the range of about 90% to 100%. For the absorption of propylene, more dilute sulfuric acid, preferably having a concentration above about 80% gives good results, and for the absorption of olefines of the higher aliphatic series, still more dilute sulfuric acid may be used with good results.

As indicated by the examples, in the formation of the alkyl halide water may be added to the reaction zone before or during the course of the reaction. The addition of water is not necessary, but it is desirable for the purposes of the present invention because it is conducive to the formation of an alcohol in the reaction zone, and this may subsequently be converted into an alkyl halide by passing the evolved gases through a catalyst promoting the reaction of the alkyl alcohol and hydrogen halide present in the gases.

The proportions of water present in the reaction zone during the formation of the alkyl halide may be varied within relatively wide limits. In general, good results may be obtained in the use of about 2.0 to about 3.0 moles of water per mole of total $H_2SO_4$ (including the $H_2SO_4$ present as an alkyl sulfuric acid). According to a procedure such as described in Example I, it is desirable to introduce into the reaction zone sufficient water to reduce the concentration of the sulfuric acid to about 78%. As previously indicated, the water may be introduced into the reaction zone as such, in the form of an aqueous solution of metal salt, as an aqueous solution of sulfuric acid, as an aqueous solution of hydrogen halide, or in any other suitable manner. One of the preferred methods of operation is to add the water to the ethylene-sulfuric acid reaction product prior to the latter's addition to a metal chloride or hydrochloric acid. The diluted mixture is preferably heated to 50° C. to 110° C. before its addition to the metal chloride or hydrochloric acid. Where the hydrogen halide is formed in situ in the reaction zone, the presence of water has the advantage that it reduces the evolution of the hydrogen halide to a desirable rate.

The temperatures at which the various reactants are brought together may vary widely. In general, it is desirable to effect the formation of the alkyl halide in the liquid phase at temperatures of about 80° C. to about 130° C. Good results have been obtained using the temperature conditions described in the examples. Temperatures above 100° C. are preferred, particularly when the operation is carried out under super-atmospheric pressure or when it is operated in conjunction with the use of a metallic halide catalyst.

The pressures may likewise vary within relatively wide limits and, in general, may be regulated to conform to the conditions of a particular reaction. The pressures may vary in different steps of the process; thus, the absorption of the olefine hydrocarbon may be effected under super-atmospheric pressure, and in the formation of the alkyl halide the pressure may be reduced to atmospheric. Alternatively, the formation of the alkyl halide may also be effected under super-atmospheric pressure. In general, the pressure should be sufficient to maintain the reaction mixture in liquid phase under the temperature conditions used. The temperature and pressure should preferably be so regulated as to allow the alkyl halide to escape from the reaction mixture. Good results may be obtained in effecting the olefine absorption under super-atmospheric pressures varying within the range of about 100 to 500 pounds per square inch.

It will be recognized that the exact method of procedure is subject to variation. The olefine hydrocarbon may be absorbed in the sulfuric acid prior to the introduction of the hydrogen halide into the reaction zone or, if desired, at the same time the hydrogen halide is introduced. The rate of evolution of the alkyl halide and other vapors evolved from the reaction zone may be regulated not only by the temperature, pressure and amount of water present, but also by other suitable means such as, for example, a reflux condenser maintained at a suitable temperature. With this method of operation, the temperature of the reaction mass is preferably about 90° C. The temperature of the reflux condenser may be such as to condense at least a part of the alkyl alcohol and water present in the evolved gases. Generally speaking, however, the reaction time may be shortened considerably and more advantageous results from the standpoint of commercial operation may be obtained by operating the process in such a manner that the alkyl halide, alkyl alcohol, hydrogen halide and water are all evolved from the reaction zone and, without refluxing, are passed directly into contact with a catalyst promoting reaction between the alkyl alcohol and hydrogen halide.

The method of converting the alkyl alcohol and hydrogen halide in the evolved vapors to an alkyl halide has not heretofore been used in conjunction with a process involving the use of an olefine hydrocarbon as one of the raw materials. Any catalyst capable of promoting the reaction between the alkyl alcohol and the hydrogen halide may be used for this purpose. As specific examples of such catalysts may be mentioned zinc chloride, ferric chloride, bismuth trichloride and antimony trichloride. These catalysts are preferably used in the form of their aqueous solutions at temperatures varying between about 100° C. and 200° C. and preferably within the range of about 120° C. to 155° C. Especially desirable results have been obtained in the use of aqueous zinc chloride catalysts having a concentration of about 68% to 73% zinc chloride. For the operation with a zinc chloride catalyst, temperatures within the range of about 133° C. to about 140° C. are preferred. The pressure in this step may be sub-atmospheric, atmospheric or super-atmospheric.

The process offers a practical method of producing the alkyl halides from cheap raw materials, such as oil refinery gases. It has a further advantage of being exceedingly flexible and enables the production of the alkyl halides in high yields.

It will be understood that by the terms "continuous" and "continuously" as used throughout the specification and claims with reference to the introduction of the reaction substances into the reaction zone and the treatment of the reaction products, it is intended to include the addition or withdrawal of such materials at intervals as in a semi-continuous process as well as their uninterrupted addition or withdrawal.

As many apparently widely different embodiments of this invention may be made without departing from the spirit and scope thereof, it is to be understood that we do not limit ourselves to the specific embodiments thereof except as defined in the following claims.

We claim:

1. In a continuous process for the production of alkyl halides containing two to four carbon atoms, inclusive, the steps which comprise continuously absorbing an olefine hydrocarbon containing two to four carbon atoms, inclusive in sulfuric acid. continuously bringing the resultant product together with an aqueous solution of a hydrogen halide in a reaction zone, maintaining the reaction mixture in liquid phase at an average temperature in excess of about 100° C., and continuously withdrawing the evolved vapors and a portion of the liquid reaction product from the reaction zone.

2. A continuous process for the production of alkyl halides containing two to four carbon atoms, inclusive, which comprises continuously passing an olefine hydrocarbon containing two to four carbon atoms, inclusive, into concentrated sulfuric acid, continuously introducing the resultant product into a reaction zone wherein is contained a metal halide and water, continuously introducing a metal halide and water into the reaction zone, maintaining the reaction mixture in liquid phase at a temperature above the boiling point of the formed alkyl halide, continuously withdrawing the evolved vapors and a portion of the liquid reaction product from the reaction zone, continuously passing said vapors in contact with a catalyst capable of promoting reaction between the alkyl alcohol and hydrogen halide in said vapors, and subjecting the resultant vapors to condensation to remove the alkyl halide.

3. In a process for the production of an ethyl halide, the steps which comprise bringing together ethylene, concentrated sulfuric acid, and a mixture of water and an alkali metal halide in the order named, and effecting reaction in the liquid phase at a temperature which is in excess of 100° C.

4. A process for the production of ethyl chloride which comprises absorbing ethylene in 90% to 100% sulfuric acid, reacting the resultant product with sodium chloride and water while maintaining the reaction mixture in liquid phase at a temperature above about 100°C., withdrawing the evolved vapors from the reaction zone, continuously passing said vapors in contact with a catalyst capable of promoting reaction between the ethyl alcohol and hydrogen chloride in said vapors, and subjecting the resultant vapors to condensation to remove the ethyl chloride.

5. A continuous process for the production of ethyl chloride which comprises continuously absorbing ethylene in 90% to 100% sulfuric acid, continuously introducing the resultant product into a reaction zone wherein is contained sodium chloride and water, continuously introducing sodium chloride and water into the reaction zone, maintaining the reaction mixture in liquid phase at a temperature above about 100° C., continuously withdrawing the evolved vapors from the reaction zone, continuously passing said vapors in contact with a catalyst capable of promoting reaction between the ethyl alcohol and hydrogen chloride in said vapors and subjecting the resultant vapors to condensation to remove the ethyl chloride.

6. The process of producing ethyl chloride which comprises absorbing ethylene in 90% to 100% sulfuric acid under super-atmospheric pressure, adding the resultant product to aqueous sodium chloride, maintaining the temperature of the reaction mixture above about 100° C. but below the boiling point, continuously removing the evolved vapors from the reaction zone, passing said vapors through an aqueous solution of zinc chloride having a concentration of about 68% to about 73% maintained at a temperature of about 135° C. to about 140° C., and condensing the ethyl chloride.

7. The process of producing ethyl chloride which comprises circulating about 635 parts of 90% to 100% sulfuric acid at a temperature of about 90° C. in contact with about 140 parts of ethylene under a super-atmospheric pressure until the ethylene is absorbed, releasing the pressure, gradually adding the resultant product and about 200 parts of water to a mixture of about 100 parts of water and about 400 parts of sodium chloride at a temperature of about 100° C. to about 108° C. under atmospheric pressure over a period of about six hours, then gradually raising the temperature to about 130° C. during a period of about four hours, passing the vapors evolved from the reaction liquid through about 1500 parts of a 70% aqueous solution of zinc chloride maintained at a temperature of about 135° C. and condensing the ethyl chloride.

8. In a process for the production of alkyl halides containing two to four carbon atoms inclusive, the steps which comprise bringing together olefines containing two to four carbon atoms inclusive, concentrated sulfuric acid, and a mixture of water and an alkali metal halide in the order named, and effecting the reaction in the liquid phase at an average temperature which is in excess of 100° C.

WILLIAM S. CALCOTT.
HERBERT WILKENS DAUDT.